UNITED STATES PATENT OFFICE.

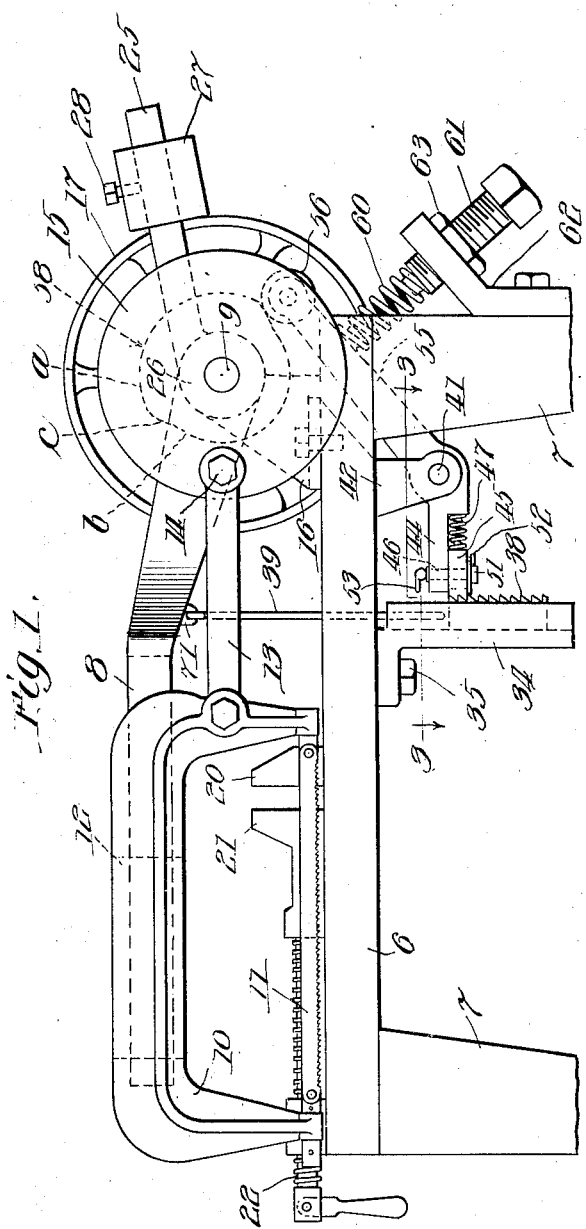

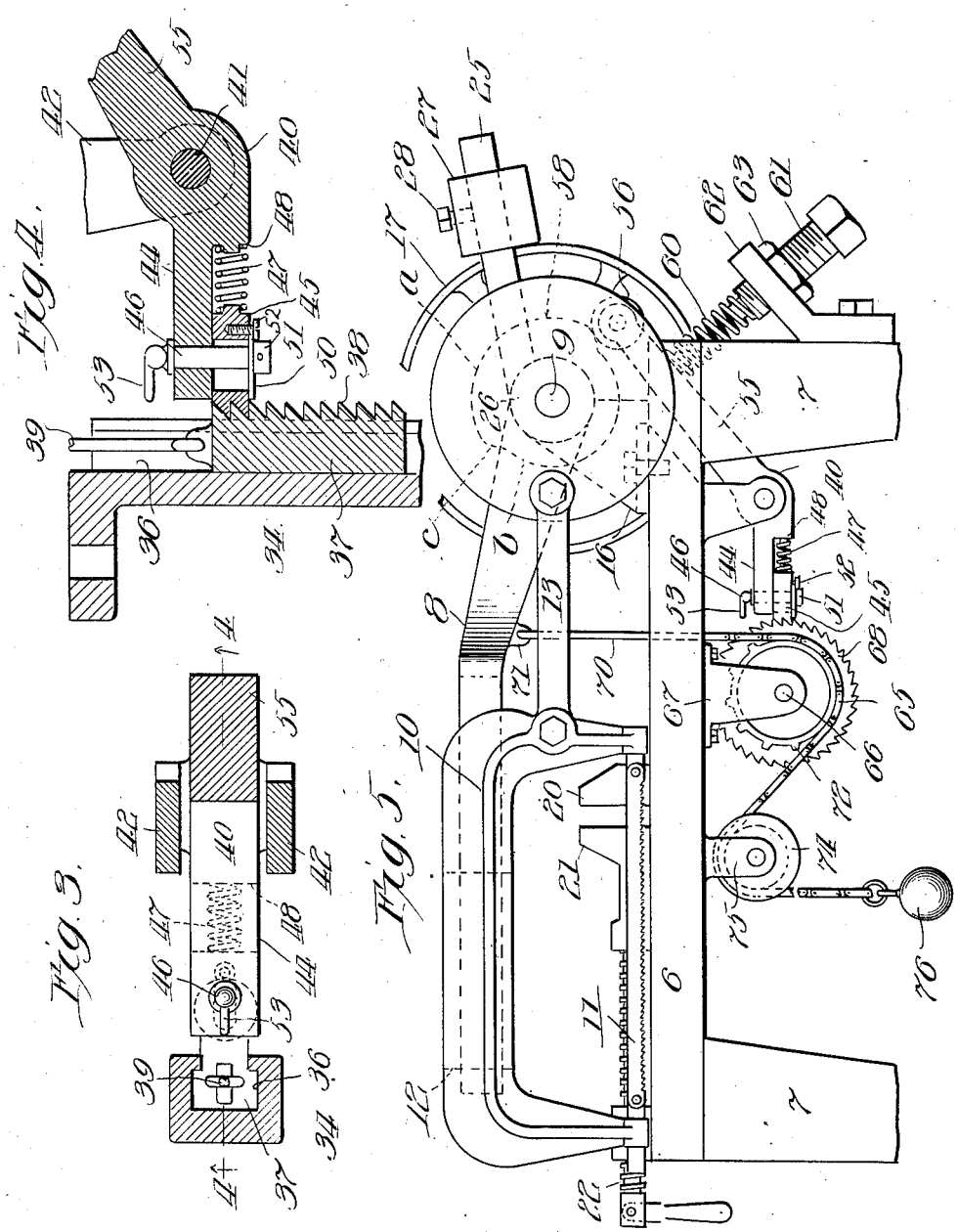

ANDREW RASMUSSEN, OF RACINE JUNCTION, WISCONSIN.

FEEDING MEANS FOR POWER HACKSAW-MACHINES.

1,025,305.          Specification of Letters Patent.          Patented May 7, 1912.

Application filed July 29, 1910. Serial No. 574,443.

*To all whom it may concern:*

Be it known that I, ANDREW RASMUSSEN, a citizen of the United States, and a resident of Racine Junction, in the county of Racine and State of Wisconsin, have invented certain new and useful Improvements in Feeding Means for Power Hacksaw-Machines; and I do hereby declare that the following is a full, clear, and exact description thereof, reference being had to the accompanying drawings, and to the characters of reference marked thereon, which form a part of this specification.

This invention relates to improvements in feeding means for power hack saw machines of that kind which releases the saw blade from the work during the non-cutting stroke of the saw so as to avoid wear on the saw and to permit the saw to cool during its non-cutting stroke.

The object of the invention is to provide an improved feeding device of this character which is adaptable to work of all kinds, in such manner as to regulate the feed of the saw to correspond with the character and hardness of the material being sawed; to provide a feed device which will press the saw gently to the work at the beginning of its cutting stroke and avoid bringing the saw abruptly to the work in a manner to injure its saw blade, and to provide a feed device which will produce a clean cut, free from roughness and unevenness.

Other objects of the invention are to provide a simple, inexpensive and compact feed device which may be readily and economically adapted to any power hack saw machine.

A feeding mechanism for power hack saw machines embodying my invention embraces means for counterbalancing the vertically swinging saw supporting guide and the saw frame carried thereby, arranged to effect such counterbalancing action during the non-cutting stroke of the saw, combined with means for pressing the saw to its work during the cutting stroke thereof. The counterbalancing of the saw supporting guide and saw frame is effected without lifting the saw a substantial distance from the bottom of the saw cut while the saw is moving through its non-cutting stroke, the teeth of the saw traveling backwardly in the non-cutting stroke thereof in substantially the same path in which they advanced in the last cutting stroke, so that when feed pressure, either spring or weight applied, is brought to bear upon the saw, said saw is moved into contact with the work gently and without such shock as will tend to injure the teeth. Moreover, inasmuch as the saw is not lifted a distance away from the bottom of the cut at the end of its cutting stroke, there is no tendency for the teeth of the saw to roughen the sides of the saw cut, is true where the saw is lifted a substantial distance at the end of its cutting stroke. Thereby the cut ends of the work are left smooth and free from roughness. The feed pressure may be exerted on the saw to press it to its work in any suitable manner, and means are provided, operative at the end of the cutting stroke of the saw, to release said pressure, which releasing means may be effected by counterbalancing the saw guide and support, as stated.

The invention consists in the matters hereinafter set forth and more particularly pointed out in the appended claims.

In the drawings,—Figure 1 is a side elevation of a power hack saw machine showing my invention applied thereto. Fig. 2 is a plan view thereof. Fig. 3 is a horizontal section on the line 3—3 of Fig. 1. Fig. 4 is a vertical section on the line 4—4 of Fig. 3. Fig. 5 is a side elevation of a power hack saw machine, showing a modification of the feeding device.

The hack saw machine may, so far as its general features of construction are concerned, follow any type or design desired. It comprises as herein shown a horizontal table 6 supported on legs 7, a vertically swinging saw frame guide and support 8 that is pivotally connected at its rear end to the main driving shaft 9 of the machine, and slidingly supports at its forward end the usual saw frame 10 between the legs of which is stretched the saw blade 11. The guiding connection between the saw frame and the vertically movable guide and support 8 consists, as shown, of a lateral lug or extension 12 on the saw frame which has guiding engagement with said support 8, as most clearly shown in Fig. 2. The reciprocating saw frame 10 is connected by a pitman 13 with an eccentrically located stud 14 on a crank disk 15 of the shaft 9 whereby the saw frame is reciprocated. The said shaft 9 is mounted in laterally separated bearings 16, 16 which rise from the rear end of the table 6 and the shaft is provided at one end with a belt pulley 17. The machine is provided at the saw end thereof with the usual stationary and movable jaws 20, 21 of a work holding vise, which is operated by the usual screw 22.

The saw frame support and guide are normally counterbalanced, when no feed pressure is exerted thereon, which occurs during the non-cutting stroke of the saw, so that at this time the saw blades will not bear with any pressure against the bottom of the saw cut in the work. Such counterbalancing effect may be produced in any suitable or preferred manner, depending upon the design of the machine or the selection of the designer. As herein shown such counterbalancing effect is produced by gravity, the said saw frame support and guide being provided with the rearwardly extending arm 25, which may be made integral with, and extend rearwardly from the bearing sleeve or hub 26 of said guide, and a counterbalancing weight 27 is slidingly mounted on said arm and is adapted to be locked thereto, as by the set screw 28.

The means for pressing the saw to its work during the cutting stroke thereof embraces means for effecting a downward pull on the saw frame support and guide, which downward pull is regulated in its force or effect to adapt it to work of different characters, and said feeding means embraces means for tripping or releasing the pressure means at the end of the cutting stroke of the saw so as to place the support and guide under the influence of the counterbalancing means described. The specific form of mechanism which I have herein shown for effecting this result is made as follows: 34 designates a bracket which depends from and is attached, as by means of the screw bolt 35, to the under side of the table 6. Said bracket is provided with a vertical way 36 in which slides a ratchet bar 37 that is adapted to be connected, as by the link 39, to the saw frame support and guide or directly thereto, said link extending upwardly through a suitable opening in the table 6. 40 designates a lever which is pivoted between its ends to a horizontal pivot pin 41 that is mounted in the lower end of a forked bracket 42 depending from the table 6. The forward or shorter arm 44 of said lever carries a dog 45 that is spring held against the teeth 38 of the ratchet bar 37. As herein shown said dog is located on the under side of a recessed portion of the arm 44 and is slotted to receive a guide bolt 46 that extends downwardly through the arm 44. The dog is held up against the ratchet teeth by a spiral, expansive spring 47 that is interposed between the rear end of the dog and a shoulder 48 on the arm 44 of said lever.

In order that the dog may be retracted to permit the ratchet bar to be moved upwardly past the same, for a purpose hereinafter described, the said guide bolt 46 is shown as rotatively mounted in the arm 44 and as provided at its lower end with an eccentric disk 50 arranged between the dog and a collar 51 attached to the lower end of the bolt. Said disk bears at its rear side against an abutment on the dog, as the screw 52. The bolt 46 is provided at its upper end with a hand piece 53 by which it may be rotated. The slot in the dog through which the bolt 46 passes is of such length that the spring 47 normally holds the dog pressed firmly against its ratchet teeth, while permitting the dog to yield backwardly to engage a next higher tooth of the ratchet bar 37 when the forward end of the lever carrying the dog is raised, as by the means hereinafter set forth. The eccentric disk 50 is so disposed on the bolt 46 as to force the dog backwardly, when the bolt is turned a half rotation from the position shown in the drawings, such distance as to release the dog from the ratchet teeth, and thereby permit the ratchet bar to be moved upwardly past the dog. The higher part of the eccentric disk may be slightly flattened or notched to engage the screw 52 when turned into position to retract the dog so as to automatically lock the dog in its retracted position.

The longer arm 55 of the lever 40 extends upwardly and rearwardly from its pivot 41, through a suitable slot in the table 6, and carries at its upper end a bearing roller 56 that is arranged beneath, and is adapted to engage the periphery of, a cam or an eccentric 58 fixed to and rotating with the power shaft 9. The periphery of the cam 58 is shown as divided into two substantially equal parts, to wit, a higher part $a$ and a lower part $b$ connected by the oblique or cam portions $c$. The longer arm of said lever 40 is normally pressed toward or against the periphery of the cam or eccentric, by means permitting said longer arm to yield backwardly away from the axis of the cam. This may be effected either through the action of a spring or weight, and such pressure may be applied in any suitable manner to the lever, depending upon its position in the machine, or upon the selection of the designer. As herein shown the lever arm 55 is pressed toward the cam by means of a spiral spring 60 which is backed by a screw 61 screw-threaded into a bracket 62 that is fixed to the rear leg of the machine. Said screw constitutes also means for adjusting the pressure by which the lever is pressed toward the cam and the screw may be locked in adjusted position by means of a jam nut 63.

The operation of the feeding device described is as follows: When the lower portion $b$ of the periphery of the cam 58 is opposite to the bearing roller 56 of the dog actuating and supporting lever 40, the spring 60 acts against the longer arm of said lever in a direction to depress the shorter arm thereof and the dog carried thereby so as to effect a downward pull, through the ratchet bar 37 and link 39, on the saw frame guide and support, and thereby press or force the saw to its work. This pressure is continued throughout one-half the rotation of the cam and, therefore, throughout the cutting stroke of the saw. At the end of the cutting stroke of the saw the higher part *a* of the periphery of the cam engages the bearing roller 56 of the dog supporting and actuating lever 40, and the longer arm of the lever is forced away from the axis of the cam, thereby raising the shorter arm of the lever and the dog carried thereby, so as to relieve the feed pressure on the saw, and to permit the saw frame support and guide to be counterbalanced. Such release of the feed pressure occurs at the end of the cutting stroke of the saw, and the dog is held away from the ratchet and the parts are counterbalanced throughout the half rotation of the cam in which the bearing roller 56 is riding over the higher part *a* of the cam, which occurs during the non-cutting stroke of the saw. The dog 45 will not, however, necessarily engage over the next higher tooth in each swinging movement of the dog actuating lever, but will be raised high enough from the ratchet tooth last engaged to release the feed pressure.

It will be observed that when the higher part *a* of the cam engages the bearing roller 56 of the dog actuating lever 40, it releases the engagement of the dog from the ratchet teeth 38, and that when such release is effected the saw frame guide and support is counterbalanced, so that during the non-cutting stroke of the saw the saw will not press against the bottom of the saw cut. Neither will the saw be raised substantially above the bottom of the saw cut, but will pass back thereover in substantially the same path in which it moved during the cutting stroke. For instance, when operating on hard material the spring 60, or other feed pressure element, may not press the bearing roller 56 of the dog actuating lever 40 entirely against or in contact with the lower portion of the cam 58, and in such case when the lever is swung back, through the action of the higher portion of the cam or eccentric on said bearing roller, the shorter arm of the lever will not be raised sufficiently to carry the dog into engagement with the next higher ratchet tooth, but the feed pressure in the next succeeding cutting stroke of the saw will be transmitted through the same ratchet tooth as that which transmitted the feed pressure in the last cutting stroke of the saw. When working on softer materials, however, the cut of the saw may be sufficiently rapid to permit the ratchet bar 37 to move downwardly, during each cutting stroke of the saw, a distance equal to the space between adjacent ratchet teeth, and in this event the movement of the dog actuating lever in each operation thereof may be sufficient to step the dog from one tooth to the next higher tooth in each upward movement of the dog. After the saw has severed the work and reaches its lowermost position, the dog guide bolt 46 is rotated to release the dog from the ratchet teeth so that the saw frame guide and support may be raised to place another piece of work under the saw.

In Fig. 5 is shown a modified form of the ratchet element for advancing the feed pressure as the saw cuts into its work. The ratchet element shown in Fig. 5 has the form of a ratchet disk 65 which is rotatively mounted on a pin 66 that is mounted in a bracket 67 which is attached to and depends from the table 6. The ratchet teeth 68 of said disk 65 are adapted for engagement by the dog in the same general manner as the ratchet teeth 38 of the bar 37 before described. Said ratchet disk is herein shown as connected to the saw frame support and guide through the means of a sprocket chain 70 attached at its upper end to a lug 71 on the said support and guide and adapted to engage sprocket teeth 72 formed on a drum which rotates with the ratchet wheel or disk 65. The sprocket chain is herein shown as continued past the sprocket teeth and is trained over an idler pulley 74 that is mounted in a bracket 75 depending from the table 6, and the free end of said chain, beyond said idler, is provided with a weight 76. The said weight serves to maintain the chain 70 taut and also prevents backward rotation of the ratchet wheel or disk when the dog is moved upwardly over the ratchet teeth for engagement with a next upper tooth. The backward rotation of the ratchet disk may be prevented by other means, and the connection between the ratchet disk and saw frame guide and support may be otherwise effected.

It will be obvious that the feed pressure exerted by both forms of feed device shown is a yielding pressure, and is also a regulable pressure, so that there is no tendency of forcing the saw beyond its capacity, and the feed pressure may be regulated to exactly accord with the character of the work. It will be furthermore observed that, inasmuch as the saw is not raised a distance above the bottom of the saw cut at the end of its cutting stroke, it is brought gently and without shock against the work in the beginning of the next succeeding cutting stroke, so that there is no liability of injuring the saw teeth. Furthermore, by reason of the fact that the saw is not raised a distance from the bottom of the saw cut, the saw teeth will not mar or roughen the sides of the saw cut during its passage therethrough in its non-cutting stroke, such as occurs when the saw is raised a substantial distance from the bottom of the saw cut.

From the foregoing it will be apparent that the structural details of my improved saw feeding mechanism may be considerably varied without departing from the essential or characteristic features of the construction. The invention is not limited to such details, therefore, except as such details are hereinafter made the subject of specific claims.

I claim as my invention:—

1. Feeding means for power hack saw machines, comprising in combination with a reciprocating saw frame and a vertically movable supporting guide, of means independent of the weight of said frame and guide for exerting feed pressure on the saw during its cutting stroke, and means for releasing said feed pressure during the non-cutting stroke of the saw, whereby the teeth of the saw on the non-cutting stroke thereof will move in a line defined by said teeth at the end of the cutting stroke.

2. Feeding means for power hack saw machines, comprising in combination with a reciprocating saw frame and a vertically movable supporting guide, means independent of the weight of said frame and guide for exerting a yielding feed pressure on the saw during the cutting stroke thereof, and means for releasing the feed pressure at the end of the cutting stroke, whereby the teeth of the saw on the non-cutting stroke thereof will move in a line defined by said teeth at the end of the cutting stroke.

3. Feeding means for power hack saw machines, comprising in combination with a reciprocating saw frame and a vertically movable supporting guide, of means independent of the weight of said frame and guide for exerting feed pressure on the saw during its cutting stroke, means for counterbalancing the saw frame and guide and means for releasing said feed pressure at the end of the cutting stroke, whereby the teeth of the saw on the non-cutting stroke thereof will move in a line defined by said teeth at the end of the cutting stroke.

4. Feeding means for power hack saw machines, comprising in combination with a reciprocating saw frame and a vertically movable supporting guide, of means independent of the weight of said frame and guide for exerting feed pressure on the saw during its cutting stroke, means for regulating said pressure and means for releasing said feed pressure at the end of the cutting stroke, whereby the teeth of the saw on the non-cutting stroke thereof will move in a line defined by said teeth at the end of the cutting stroke.

5. Feeding means for power hack saw machines comprising, in combination with the reciprocating saw frame and its vertically movable supporting guide, means for exerting feed pressure on the saw during its cutting stroke, means for releasing said feed pressure, without lifting the saw, during the non-cutting stroke of the saw, and means for releasing the feed pressure means from the saw, constructed to permit the supporting guide and saw frame to be raised relatively to the pressure means.

6. Feeding means for power hack saw machines comprising, in combination with the reciprocating saw frame and its vertically movable supporting guide, a cam movable with the saw, a pivoted lever one arm of which is acted upon by said cam, a feed pressure device acted upon by the other arm of said lever, means acting, through the lever and feed device, to exert feed pressure on the saw during the cutting stroke thereof, and the cam acting to release feed pressure from the saw at the end of the cutting stroke, and means whereby the saw frame and guide are counterbalanced when the feed pressure is so released.

7. Feeding means for power hack saw machines comprising, in combination with the reciprocating saw frame and vertically movable supporting guide, of cam controlled means for exerting feed pressure on the saw during its cutting stroke, embracing means to release the feed pressure at the end of the cutting stroke, and means for counterbalancing the saw frame and support when the feed pressure is so released and operative throughout the non-cutting stroke of the saw.

8. Feeding means for power hack saw machines comprising, in combination with the reciprocating saw frame and its vertically movable supporting guide, a ratchet connected to and movable with the supporting guide, a cam actuated lever, a dog on the lever to engage the ratchet during the cutting stroke of the saw to press the saw to its work, said cam releasing the dog from the ratchet at the end of the cutting stroke and means operating to counterbalance the saw frame and supporting guide when so released.

9. Feeding means for power hack saw machines comprising, in combination with the reciprocating saw frame and its vertically movable supporting guide, a ratchet connected to and movable with the supporting guide, a spring controlled dog engaging said ratchet, a rotative cam, a swinging lever carrying the dog and having a bearing engaging the cam, and arranged during a part of the rotation of the cam to press the dog upon the ratchet, and during another part to release the dog from the ratchet, and means to counterbalance the saw frame and guide when the dog is released from said ratchet.

10. Feeding means for power hack saw machines comprising, in combination with the reciprocating saw frame and its vertically movable supporting guide, a ratchet connected to and movable with the supporting guide, a spring controlled dog engaging said ratchet, a rotative cam, a swinging lever carrying the dog and having a bearing engaging the cam, and arranged during a part of the rotation of the cam to press the dog upon the ratchet, and during another part to release the dog from the ratchet, means to counterbalance the saw frame and guide when the dog is released from said ratchet, and adjusting means acting on said lever to vary the feed pressure exerted therethrough on the saw.

11. Feeding means for power hack saw machines comprising, in combination with the reciprocating saw frame and its vertically movable supporting guide, a cam or eccentric movable with the saw, a pivoted lever one arm of which is acted upon by the cam or eccentric, a ratchet movable with the supporting guide, a spring controlled dog carried by said lever for engagement with the ratchet, a guide bolt on the lever for the dog having means to retract the dog away from the ratchet, said cam or eccentric acting through the lever, the dog and ratchet during the cutting stroke of the saw to press the saw to its work, and to release the feed pressure at the end of the cutting stroke, and means for counterbalancing the saw frame and guide when the feed pressure is so released and operative throughout the non-cutting stroke of the saw.

12. In a power hack saw machine, the combination of a power shaft, a reciprocating saw frame, a supporting guide for the frame pivoted to the power shaft, operative connections between the power shaft and saw frame to reciprocate the latter, means to counterbalance the saw frame and its guide, means independent of the weight of said frame and guide for exerting feed pressure on the saw during its cutting stroke, and means for releasing said feed pressure at the end of the cutting stroke, whereby the teeth of the saw on the non-cutting stroke thereof will move in a line defined by said teeth at the end of the cutting stroke.

13. The combination, in a power hack saw machine, of a power shaft, a reciprocating saw frame, a supporting guide for the frame pivoted to the power shaft, operative connections between the power shaft and saw frame to reciprocate the latter, a cam or eccentric fixed to the power shaft, a pivoted lever engaging said cam or eccentric, feed pressure means actuated by said lever and means to press the lever against the cam, all arranged to exert a yielding feed pressure on the saw during the cutting stroke thereof and to release said feed pressure without substantially lifting the saw during the non-cutting stroke of the saw.

14. The combination, in a power hack saw machine, of a power shaft, a reciprocating saw frame, a supporting guide for the frame pivoted to the power shaft, operative connections between the power shaft and saw frame to reciprocate the latter, means to counterbalance the saw frame and its guide during the non-cutting stroke of the saw, a cam or eccentric fixed to the power shaft, a pivoted lever engaging said cam or eccentric, feed pressure means actuated by said lever arranged to exert feed pressure on the saw during the cutting stroke thereof and to release said feed pressure to permit the saw frame and guide support to be counterbalanced during the non-cutting stroke of the saw, and yieldable adjusting means acting on said lever to press it toward the cam or eccentric.

In testimony that I claim the foregoing as my invention I affix my signature in the presence of two witnesses, this 26th day of July A. D. 1910.

ANDREW RASMUSSEN.

Witnesses:
W. L. HALL,
WILLIAM GOLDBERGER.